(12) United States Patent
Derrien (10) Patent No.: US 11,285,656 B2
(45) Date of Patent: Mar. 29, 2022

(54) MOLD FOR CONTAINER, COMPRISING A MOLD BASE PROVIDED WITH A CENTRAL WELL, AND A STRETCHING ROD WITH A HEMISPHERICAL END

(71) Applicant: SIDEL PARTICIPATIONS, Octeville-sur-Mer (FR)

(72) Inventor: Mikael Derrien, Octeville-sur-Mer (FR)

( * ) Notice: Subject to any disclaimer, the term of this patent is extended or adjusted under 35 U.S.C. 154(b) by 109 days.

(21) Appl. No.: 16/645,438

(22) PCT Filed: Jul. 13, 2018

(86) PCT No.: PCT/FR2018/051784
§ 371 (c)(1),
(2) Date: Mar. 6, 2020

(87) PCT Pub. No.: WO2019/048747
PCT Pub. Date: Mar. 14, 2019

(65) Prior Publication Data
US 2020/0282624 A1    Sep. 10, 2020

(30) Foreign Application Priority Data

Sep. 8, 2017 (FR) .................................... 1758294

(51) Int. Cl.
| | |
|---|---|
| *B29C 49/12* | (2006.01) |
| *B29C 49/48* | (2006.01) |
| *B29C 49/06* | (2006.01) |
| *B29K 67/00* | (2006.01) |
| *B29L 31/00* | (2006.01) |

(52) U.S. Cl.
CPC .......... *B29C 49/4802* (2013.01); *B29C 49/06* (2013.01); *B29C 49/12* (2013.01); *B29C 2049/1238* (2013.01); *B29K 2067/003* (2013.01); *B29L 2031/7158* (2013.01)

(58) Field of Classification Search
CPC .... B29C 2049/1228; B29C 2049/1238; B29C 2049/1242; B29C 49/12
See application file for complete search history.

(56) References Cited

U.S. PATENT DOCUMENTS 4,233,010 A * 11/1980 Suzuki .................... B29C 49/12
264/535
6,277,321 B1   8/2001 Vailliencourt et al.
(Continued)

FOREIGN PATENT DOCUMENTS

FR    2939071 A1    6/2010
JP    52101265 A  *  8/1977    ..... B29C 2049/1238

*Primary Examiner* — Robert B Davis (57) ABSTRACT

The invention relates to a mold for a container that includes a mold base. The mold base includes a peripheral face, a central dome, and a central well formed in the dome and extending along a frustoconical sidewall from a top edge of the dome having a top diameter, to a bottom having a bottom diameter smaller than the top diameter. The mold also includes a stretching rod that ends with a hemispherical distal end having a radius, the value of which is between that of the bottom radius and that of the top radius of the central well. When the rod is in the bottom position, it is separated from the sidewall of the central well by a distance smaller than the distance that separates it from the bottom of the well.

18 Claims, 4 Drawing Sheets

(56) References Cited

U.S. PATENT DOCUMENTS

| | | | | |
|---|---|---|---|---|
| 8,950,611 B2* | 2/2015 | Derrien | ............... | B65D 79/005 |
| | | | | 215/373 |
| 2011/0193271 A1* | 8/2011 | McCrary | ................ | B29C 49/12 |
| | | | | 264/532 |
| 2012/0037645 A1 | 2/2012 | Boukobza | | |
| 2015/0375442 A1 | 12/2015 | Penet et al. | | |

* cited by examiner

MOLD FOR CONTAINER, COMPRISING A MOLD BASE PROVIDED WITH A CENTRAL WELL, AND A STRETCHING ROD WITH A HEMISPHERICAL END

The invention relates to the manufacturing of containers, particularly bottles, by blow-molding or stretch blow-molding of blanks (preforms or unfinished intermediate containers) made from a thermoplastic material such as PET (polyethylene terephthalate).

A container ordinarily comprises a body, which gives the container its volume, an open neck, which extends protruding from an upper end of the body and through which the container is filled (generally with a liquid or paste), and a bottom, which closes the body at the opposite end to the neck and forms a base by which the container should be able to rest stably on a flat surface such as a table.

A container is ordinarily formed by stretch blow-molding in a mold that comprises a mold block, an inner wall of which defines an at least partial shape of the body of the container, a mold base, an upper molding face of which defines an at least partial shape of the container, and a stretching rod mounted sliding between a top position, in which the rod is separated from the mold base, and a bottom position, in which a distal end of the rod (by which the rod exerts axial thrust on the blank that contributes to its elongation) is near the mold base.

For some applications, which require a large cubic capacity (typically detergents), the containers are provided with concave recesses that form a handle that facilitates handling. These concave recesses are ordinarily formed in the mold by means of protuberances formed on the inner wall. In general, these protuberances are formed by movable inserts that, in an extended position, protrude relative to the inner wall so as to push back the material of the container during the forming thereof.

The manufacturing of the containers is not without difficulties.

A first difficulty is the need to provide the bottom of the container with sufficient structural rigidity to allow it to retain its shape (so as to ensure its stability) even under the pressure of the contents, in spite of the thinness of the material, particularly as the mass of the containers is now being reduced due to strict environmental standards.

To provide the bottom with this structural rigidity, it is common to give it a concave shape (i.e. the bottom protrudes towards the inside of the container from the base). This shape alone is generally insufficient, and it is also common to provide stiffeners too, typically in the form of ribs.

A second difficulty is that of ensuring the correct forming of the container. It is important that the material is distributed as evenly as possible over the whole body and bottom, so as to prevent the occurrence of weak zones that would detract from the mechanical strength or stability of the container.

The problem that arises during the forming of a container provided with handles is that the material is subject to uneven stresses due to the need to form these handles. More specifically, the protuberances intended to form a handle exert forces on the material that cause, in some zones of the container being formed, tensions such that the material slides locally relative to the wall or relative to the mold base. This results in an undesirable imbalance in the distribution of the material.

Some manufacturers envisage giving the distal end of the rod a shape that complements the mold base; this is the case for the rod proposed in patent U.S. Pat. No. 6,277,321 (Schmallbach). However, even such a shape does not necessarily solve the problems of sliding material. The material should be gripped strongly using the rod, but this comes at the expense of the integrity of the material; moreover, in some machine configurations (typically the electric or electromagnetic control of the rod), excessive resisting forces applied to the rod are capable of causing a fault on the machine.

The need therefore remains to propose a solution that not only makes it possible to obtain a container that, provided with concave recesses forming a handle, is sufficiently rigid, particularly on its bottom, but also to guarantee distribution of the material that is as even as possible despite the tensions to which the material is subjected during the shaping of the handles (particularly by means of inserts) during the forming of the container.

To this end, firstly, a mold is proposed for the forming by stretch blow-molding of a container from a plastic blank, this container comprising a body, which extends along a main axis and is closed by a bottom defining an annular base that extends in a resting plane substantially perpendicular to the main axis, the bottom having, starting from the base and in the direction of the main axis, a concave arch pointing towards the inside of the container, a central bulb that protrudes from the arch towards the inside of the container, and a slug that protrudes at the vertex of the bulb towards the outside of the container, this mold comprising:

a mold block, an inner wall of which defines an at least partial shape of the body of the container, the inner wall extending along a main axis corresponding to the main axis of the container;
  a mold base having an upper molding face that defines an at least partial shape of the bottom of the container, the mold base having:
    a peripheral face that complements the arch and extends sloping from near the main axis to an annular groove that complements the base,
    a central dome that complements the bulb and protrudes from the peripheral face towards the inside of the mold, and
    a central well that complements the slug, formed in the dome and extending along a truncated conical side wall from a top edge of the dome having a top diameter, to a bottom having a bottom diameter the value of which is smaller than the value of the top diameter;
  a stretching rod that ends in a distal end and is mounted sliding relative to the mold block between a top position in which the distal end is separated from the mold base, and a bottom position in which the distal end is near the mold base,
this mold being characterized in that, in the bottom position of the rod, its distal end is separated from the side wall of the well by a distance smaller than a distance that separates it from the bottom of the well.

Secondly, a method is proposed for manufacturing a container in such a mold, from a plastic blank, which comprises the operations consisting of:
  inserting into the mold the blank, previously heated to a temperature greater than the glass transition temperature of its constituent material;
  injecting a pressurized fluid into the blank;
  moving the stretching rod from its top position to its bottom position in order to ensure the shear clamping of the material between the distal end of the rod and the truncated conical side wall.

Thirdly, a container obtained using this method is proposed.

At the end of forming, the material is locally held between the distal end of the rod and the truncated conical side wall of the central well, without however being crushed. This holding prevents general sliding (and offsetting) of the material from occurring under the effect of the asymmetrical tensions that prevail therein, particularly when it is stretched over protuberances protruding from the wall of the mold block. This ensures improved evenness in the distribution of the material, to the benefit of the structural rigidity and balance of the container.

A number of additional features can be envisaged, alone or in combination. Thus, for example:

The side wall has an angular aperture, relative to the main axis, of between 10° and 30°; the angular aperture of the side wall is approximately 20°;

The value of the ratio between the bottom diameter at the bottom of the well and the top diameter at the top edge of the well (and therefore the ratio between the value of the bottom radius of the bottom of the well and the value of the top radius of its top edge) is between 65% and 85%;

In the bottom position of the stretching rod, the distal end thereof is separated from the side wall of the well by approximately 2.5 mm;

The wall of the mold block is rotationally asymmetrical about the main axis.

The mold comprises at least one insert that can move transversely relative to the mold block, between a retracted position in which the insert is set back from the wall, and an extended position in which the insert protrudes from the wall to form a concave recess in the body of the container;

The distal end of the stretching rod is hemispherical and has a radius the value of which is smaller than the value of the top radius of the central well;

As a variant, the distal end of the rod is flat; in this case, the value of the diameter of the distal end of the rod is advantageously smaller than the value of the bottom diameter, moreover, the rod can, near its end, have some taper, the value of which is preferably smaller than the angular aperture of the side wall of the well.

Further objects and advantages of the invention will become apparent in light of the following description of one embodiment, given with reference to the attached drawings, in which.

Figure 1:
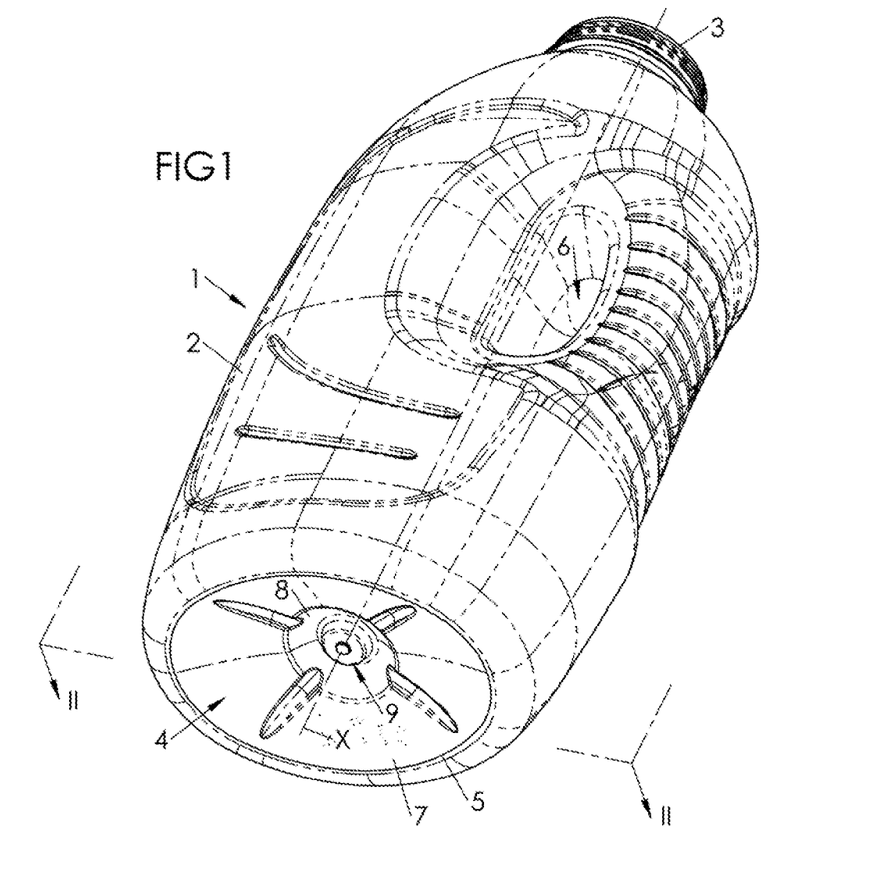
FIG. 1 is a bottom perspective view of a container according to the invention.

FIG. 1 shows a container 1. In this case, it is a bottle, intended to receive contents such as a liquid detergent. The container 1 illustrated has a large capacity, i.e. greater than two liters (and for example four liters).

The container 1 is preferably made from plastic, for example PET.

The container 1 comprises a body 2, which extends along a main axis X. At an upper end of the body 2, it is extended by an open neck 3 through which the container 1 is filled during packing (and then emptied during use). At a lower end of the body 2, the container 1 ends in a bottom 4 that closes the body 2 and defines an annular base 5 that extends in a resting plane P substantially perpendicular to the main axis X.

According to one embodiment, the main axis X is aligned with a central axis of the neck 3. More specifically, the main axis X is, in the example illustrated, the axis joining the geometric center of the neck 3 and the geometric center of the bottom 4. As a variant, the neck 3 could be offset relative to the body 2.

As can be seen in FIG. 1, the body 2 of the container 1 is provided with a concave recess 8 that forms a handle intended to facilitate the handling of the container 1 (which is necessary given its significant volume and weight).

In the example shown, the container 1 has a general plane of symmetry (aligned with the line II-II) and comprises two back-to-back concave recesses 6, which jointly form the handle and are respectively intended to accommodate the thumb and the other fingers of the hand that grasps the container 1.

Figure 2:
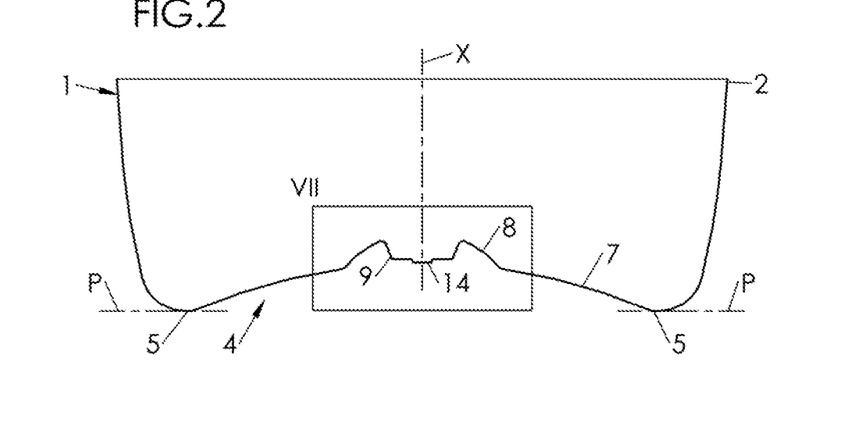
FIG. 2 is a cross-sectional view of the bottom of the container in FIG. 1, along the line II-II.

The bottom 4 has, starting from the base 5 and radically in the direction of the main axis X:

A concave arch 7 pointing towards the inside of the container 1;

A central bulb 8 that protrudes from the arch 7 towards the inside of the container 1;

A slug 9 that protrudes from the vertex of the bulb 8 towards the outside of the container 1.

As can be seen in FIG. 1, the container 1 is rotationally asymmetrical about its main axis X.

Thus, in the example illustrated, the base 5 has an oval shape (which corresponds to the general cross-sectional outline of the body 2 of the container 1, as assessed in a transverse plane perpendicular to the main axis X). However, this shape is for illustration only, and the base 5 (like the cross-section of the body 2) could be rectangular, or square.

Furthermore, the body 2 of the container 1 could, as a variant (excluding the concave recesses 6), be generally rotationally symmetrical, the base 5 being in this case circular.

Figures 3, 4:
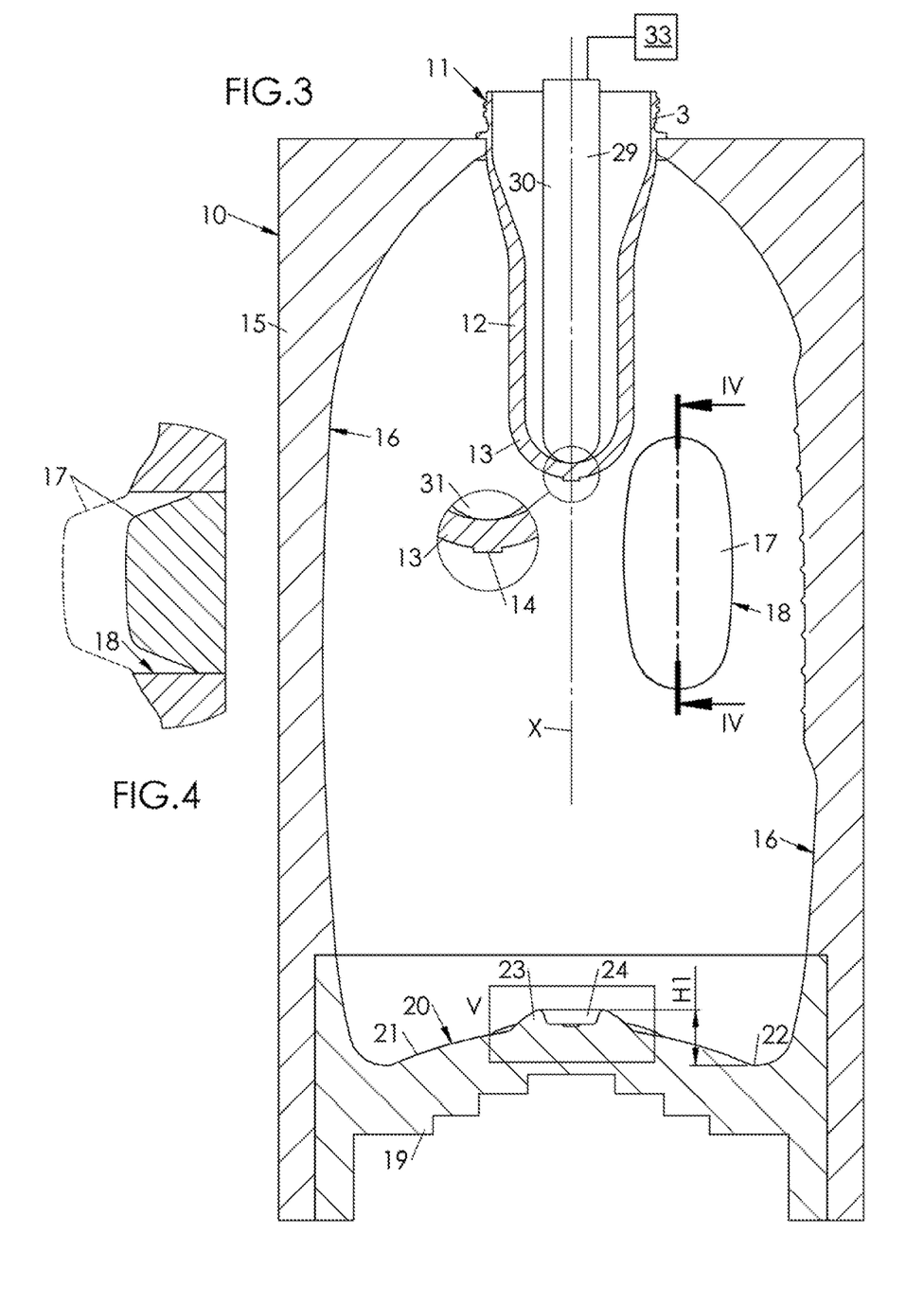
FIG. 3 is a cross-sectional view of a mold for the forming by stretch blow-molding of the container in FIG. 1.
FIG. 4 is a local cross-sectional view of the mold in FIG. 3, along the line IV-IV.

The container 1 is formed in a mold 10 by stretch blow-molding from a blank 11. In the example illustrated, the blank 11 is a preform, which term will be used below for simplicity.

The preform 11 comprises a generally cylindrical body 12, a neck 3 that opens at an upper end of the preform 11 (when it is in position in the mold 10), and a hemispherical bottom 13 that closes the body 12 at a lower end. The neck 3 has a shape that remains unchanged during the forming of the container 1.

The preform 11 is obtained by injection into a mold with its shape. In the example illustrated in the detailed inset in the center of FIG. 3, the preform 11 is provided with an injection sprue 14 that protrudes from its bottom 13.

This sprue 14, which can have a variable thickness, corresponds to residual material originating from an injection channel supplying the mold of the preform 11. The sprue 14 is not deburred: in some machines, it can be used to good effect during the forming of the container 1 to help to keep it in line during forming and thus minimize the risk of sliding material. In the examples illustrated in FIG. 2, figure I.A, FIG. 8B, FIG. 7A and FIG. 7B, the sprue 14 remains on the bottom 4 of the container 1.

The mold 10, illustrated in cross-section in FIG. 3, firstly comprises a mold block 15. This mold block 15 can be subdivided into two symmetrical parts (called mold halves) articulated around a hinge between an open position (not shown) in which the mold halves are separated from each other to enable the removal of a formed container 1 and the insertion of a new preform 11, and a closed position in which the mold halves are pressed against each other to form together a closed space in which the container 1 is formed.

The mold block 15 has an inner wall 16 that defines an at least partial shape of the body 2 of the container 1. The inner wall 16 extends along a main axis X that corresponds to the main axis X of the container 1 (which is why they have identical reference signs).

Hereinafter, the expression "main axis" refers equally to the main axis X of the container 1 and to the axis defined by the mold block 15. When, as in the example illustrated, the container 1 is rotationally asymmetrical about the main axis X, the same of course applies to the wall 16.

According to a particular embodiment, illustrated particularly in FIG. 3 and FIG. 4, the mold 10 secondly comprises at least one insert 17 that can be moved transversely relative to the mold block 15 between:
- a retracted position (in solid lines in FIG. 4) in which the insert 17 is set back from the wall 16, and
- an extended position (in dotted lines in FIG. 4) in which the insert 17 protrudes from the wall 16 to form a concave recess 6 in the body 2 of the container 1.

According to one embodiment, the mold 10 comprises two symmetrical facing inserts 17 (one in each mold half) intended to each form a concave recess 6.

The insert 17 (or each insert 17) is mounted sliding in a complementary slot 18 made in the mold block 15. The movement of the insert 17 from its retracted position to its extended position (and vice versa) can be carried out by means of a pneumatic, hydraulic or electric cylinder.

This/these insert(s) 17 make(s) it possible to produce one or more deep concave recesses 6. However, it is possible to produce one or more less deep concave recesses by means of a protuberance formed directly on the wall 16.

The mold 10 thirdly comprises a mold base 19. The mold base 19 completes, with the mold block 15, the shape of the container 1 (excluding the neck 3).

To this end, the mold base 19 has an upper face 20 that defines an at least partial shape of the bottom 4 of the container 1.

More specifically, the mold base 19 firstly has a peripheral face 21 that complements the arch 7 and extends sloping from near the main axis X to an annular groove 22 that complements the base 5.

The mold base 19 secondly has a central dome 23 that complements the bulb 8 and protrudes from the peripheral face 21 towards the inside of the mold 10.

The mold base 19 thirdly has a central well 24, formed in the dome 23 towards the outside of the mold 10, and in which the slug 9 is intended to be formed. The central well 24 extends along a truncated conical side wall 25, from a top edge 26 of the dome 23, to a bottom 27.

When, as in the example illustrated, the container 1 (and therefore the bottom 4 thereof) is rotationally asymmetrical about its main axis X, the same of course applies to the mold base 19.

Figure 5:
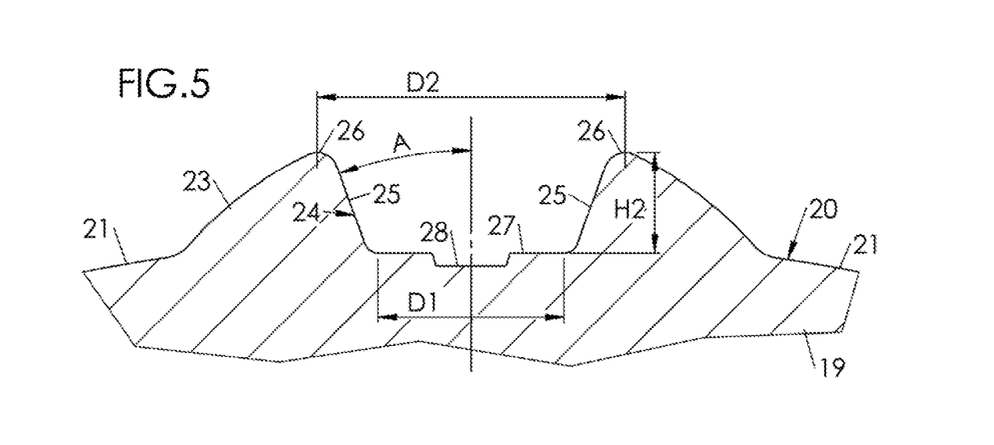
FIG. 5 is a detailed view, on a larger scale, of the base of the mold in FIG. 3, taken in the inset V.

The following references are used (see FIG. 3 and FIG. 5):

D1 is the diameter of the bottom 27 of the well 24 ("bottom diameter"); the corresponding radius ("bottom radius") therefore has a value of D1/2;

D2 is the diameter of the top edge 26 of the dome 23 ("top diameter"); the corresponding radius ("top radius") therefore has a value of D2/2;

A is the angular aperture of the side wall 25, which corresponds to the half-cone angle at the vertex of the cone on which the side wall 25 is based;

H1 is the overall height of the upper molding face 20, measured between the bottom of the annular groove 22 and the top edge 26 of the dome 23;

H2 is the depth of the central well 24, measured between the bottom 27 of the well and the top edge 26 of the dome 23. D1 and D2 are such that:

$$D1 < D2$$

D1 and D2 are advantageously in a ratio such that $$65\% \leq \frac{D1}{D2} \leq 80\%$$

And, according to a preferred embodiment illustrated in FIG. 5:

$$\frac{D1}{D2} \approx 68\%$$

The angular aperture A of the side wall is preferably such that:

$$10 < A < 30'$$

And, according to a preferred embodiment illustrated in FIG. 5:

$$A \approx 20°$$

H1 and H2 are advantageously in a ratio such that:

$$\frac{1}{5} \leq \frac{H2}{H1} \leq \frac{2}{5}$$

According to one embodiment illustrated particularly in FIG. 5, the bottom 27 of the well 24 has a hole 28 in its center sized to partially accommodate the injection sprue 14 formed protruding on the preform 11.

The mold 10 fourthly comprises a stretching rod 29.

The rod 29 has a cylindrical or tubular body 30, which extends parallel to the main axis X (and, in the example illustrated, along the main axis X). The rod 29 ends in a distal end 31.

Figure 6A:
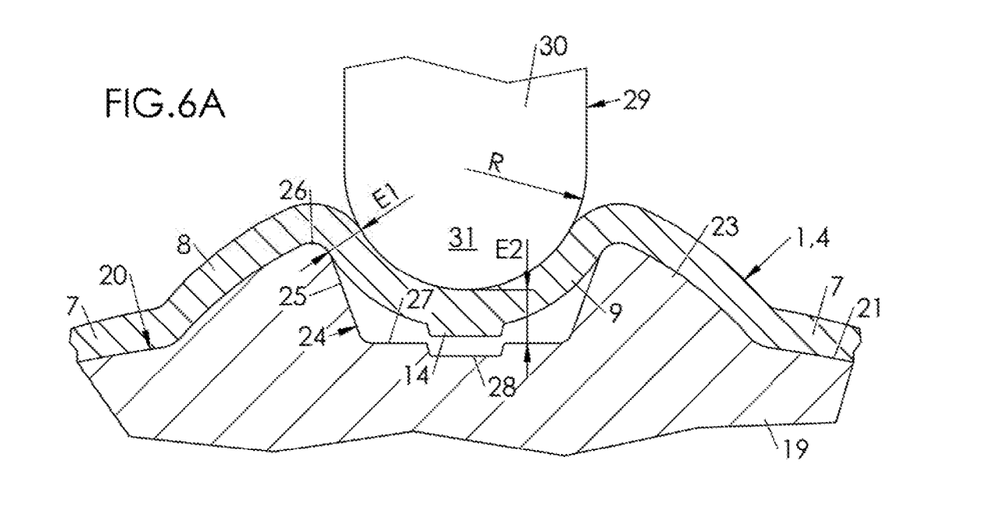
FIG. 6A is a similar view to FIG. 5, illustrating the end of the forming of the container, with a rod, the end of which is hemispherical.

The rod 29 is mounted sliding relative to the mold block 16 between:
- a top position in which the distal end 31 is separated from the mold base 19 (FIG. 3), and
- a bottom position (figure GA) in which the distal end 31 is near the mold base 19.

According to a first embodiment illustrated in FIG. 6A the distal end 31 of the stretching rod 29 is hemispherical; the sphere on which the distal end is based has a radius, denoted R. This radius R of the end 31 of the rod 29 is such that its value is smaller than the value of the top radius (i.e. half of the value of the top diameter):

$$R<D2/2$$

According to a preferred embodiment, the value of the radius R of the end 31 of the rod 29 is also less than or equal (or substantially equal) to the value of the bottom radius, i.e. half of the value of the bottom diameter:

$$R \leq D1/2$$

or $$R \approx D1/2$$

Figure 7A:
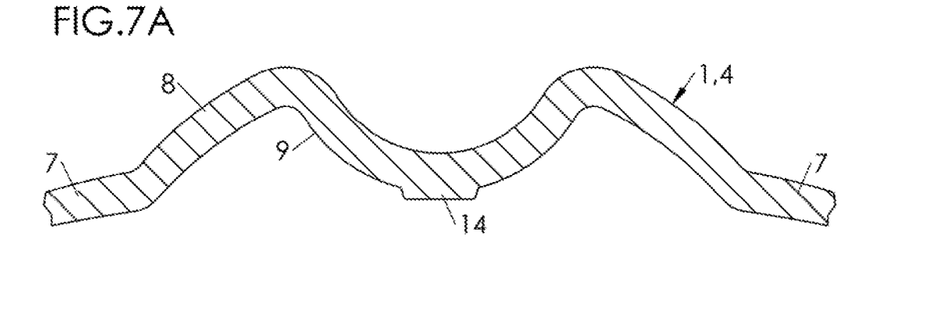
FIG. 7A is a detailed cross-sectional view, on a larger scale, of the bottom of the container in FIG. 3, taken in the inset VII, formed with a rod as illustrated in FIG. 6A.

As can be seen in figure 6A, in this first embodiment, the slug 9 does not completely follow the shape of the well 24, but instead follows the shape of the hemispherical end 31 of the rod 29. In this case, as illustrated in FIG. 7A, the slug 9 is substantially spherical.

Figure 6B:
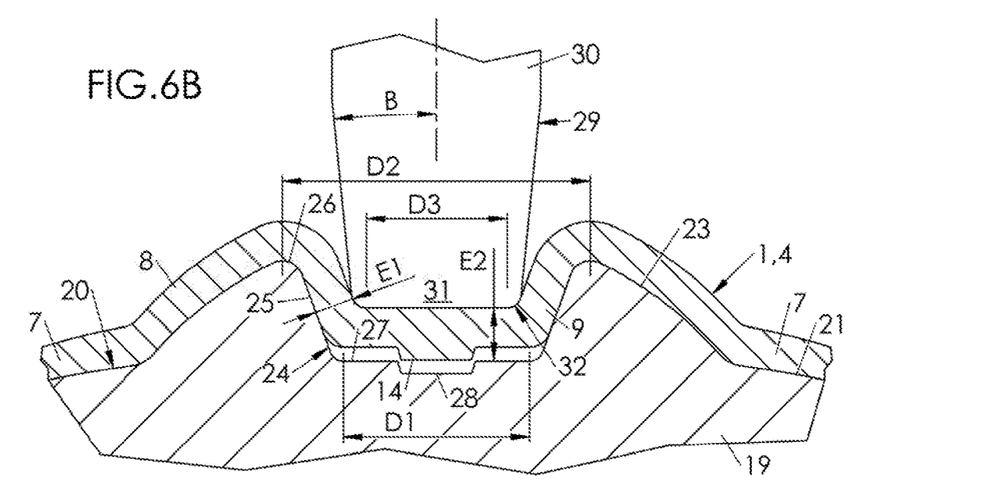
FIG. 6B is a similar view to FIG. 6A, illustrating a variant in which the rod has a conical end.

According to a second embodiment illustrated in FIG. 6B, the distal end 31 of the stretching rod 29 is flat. The value of the diameter, denoted D3, of the end 31 of the rod 29 is then preferably less than or equal to the value of the bottom diameter D1 of the well 24:

$$D3 \leq D1.$$

This makes it possible for the rod 29 to be partially inserted into the well 24. In this case, to limit the risk of perforation of the material of the preform 11 during forming, the end 31 is advantageously provided with a fillet 32.

Furthermore, in this second embodiment, the rod 29 can have, near its end 31, a taper B (defined here as the half-cone angle at the vertex of the cone on which the end 31 is based). This taper B is advantageously less than or equal to the angular aperture A of the well:

$$B \leq A.$$

Figure 7B:
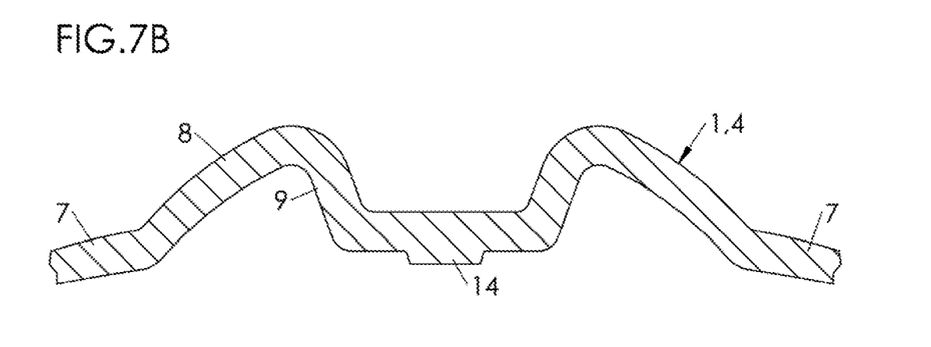
FIG. 7B is a similar view to FIG. 7A, showing the bottom of the container formed with a rod as illustrated in FIG. 6B.

As can be seen in FIG. 6B, in this second embodiment, the slug 9 does not completely follow the shape of the well 24 as the material does not reach the bottom 27. However, given the closeness of the shapes of the well 24 and the end 31 of the rod 29, the profile of the slug 9 is, like the profile of the well 24, conical (FIG. 7B).

Whatever shape is selected for the rod 29, in the bottom position thereof, its distal end 31 is separated from the side wall 25 of the well 24 by a distance E1 smaller than the distance, denoted E2, that separates it from the bottom 27 of the well 24:

$$E1<E2.$$

A fine adjustment of one and/or the other of the distances E1. E2 can be obtained by means of an electric or electromagnetic device 33 for controlling the position of the rod 29. Such a device 33 makes it possible to know at all times the vertical position of the end 31 of the rod 29 and, as a result, its exact positioning relative to the mold base 19.

The following procedure is followed in order to manufacture the container 1.

A first operation consists of inserting into the mold 10 a preform 11 previously heated to a temperature greater than its glass transition temperature. In the case of PET, the glass transition temperature of which is approximately 80=C, the preform 11 is for example heated to a temperature greater than or equal to approximately 100° C.

A second operation (known as blowing) consists of injecting a pressurized fluid (particularly a gas, typically air) into the preform 11.

In practice, this operation is subdivided into two steps: a preblowing step in which the injection pressure (referred to as the preblowing pressure) is moderate (less than 15 bar), and a blowing step proper, in which the injection pressure (referred to as the blowing pressure) is high (greater than or equal to 25 bar).

An operation that complements the blowing (known as stretch-blowing) consists, during injection, of moving the stretching rod 29 from its top position to its bottom position, so as (due to the dimensions set out above) to grip the material between the distal end 31 of the rod 29 and the truncated conical side wall 25 (FIG. 6A, FIG. 69). In practice, the stretching takes place during preblowing. This is interrupted (and blowing ordered) as soon as the stretching rod 29 has reached its bottom position.

In the example illustrated, in which the mold 10 is provided with movable inserts 17, a final operation, known as boxing, consists, during preblowing, of moving each insert 17 from its retracted position to its extended position. The material is applied against each insert 17, without however following its shape closely, as the pressure prevailing in the blank of the container being formed is insufficient.

At the end of preblowing, the material is locally held between the distal end 31 of the rod 29 and the truncated conical side wall 25 of the central well 24 (whether the rod is hemispherical, FIG. 6A or conical, FIG. 6B), without being crushed against the bottom 27 of the well 24.

As illustrated in FIGS. 6A and 68, the distal end 31 of the rod 29 is indeed far enough away from the bottom 27 of the well 24 that the material is not gripped between this distal end 31 and the bottom 27 of the well 24. This preserves the integrity of the material by preventing it from being perforated by the rod 29. It also makes it possible to maintain the normal operation of the electric (or electromagnetic) device 33 for controlling the rod 29, as the axial resisting forces exerted against it by the mold base 19 are minimized.

However, the gripping of the material between the hemispherical distal end 31 and the side wall 28 is enough to provide excellent holding of the material during blowing, when, under the high pressure, the concave recesses 6 are shaped by stretching the material on the inserts 17. The material is then gripped—and clamped—between the rod 29 and the mold base 19, without however being crushed.

It can be seen in figure 8A and FIG. 6B that the surface of material actually gripped between the rod 29 and the mold base 19 is very small in relation to the neighboring surfaces (surface 31 of the rod 29; surface of the well 24). Given the dimensional choices set out above (particularly D1, D2, D3, R and their consequences on E1 and E2), and the tangential approach of the rod 29 relative to the side wall 25 of the well 24, the stress to which the material gripped between the end 31 of the rod 29 and the side wall 25 is subjected is essentially shear stress. This shear causes good local adherence of the material to the respective surfaces of the rod 29 and the well 24.

This shear is made possible by the fact that the distance E1 that separates the distal end 31 of the rod 29 from the side wall 25 of the well 24 is smaller than the distance, denoted E2, that separates it from the bottom 27 of the well 24, which provides the rod 29 with some axial travel after the material has been sandwiched between its end 31 and the side wall 25 of the well 24. Such travel and, consequently, the aforementioned shear, would not exist if the rod 29 simultaneously abutted against the bottom 27 of the well 24, that is, if the distances E1 and E2 were equal or practically equal (i.e. E1≈E2)

The sliding of the material clamped in this way is minimized under the effect of the tensions caused by the stretching of the material on the inserts 17. This results in satisfactory evenness in the distribution of the material.

Such clamping is obtained effectively even though the axial resisting forces exerted by the mold base 19 (through the material of the container 1) are limited.

The resultant of the resisting forces exerted by the mold base 19 are normal to the surface where the clamping takes place, that is, normal to the surface of the side wall 25.

This resultant comprises a small axial component (proportional to the sine of angle A), and a comparatively larger radial component (proportional to the cosine of angle A).

The thickness of the bottom 13 of the preform 11 can vary (it is for example between 3 mm and 4 mm). During forming, however, this thickness decreases. At the center of the bottom 4 of the container 1, at the end of forming, the material thickness can remain greater than or equal to 2.5 mm due to the small degree of stretch to which it is subjected.

In this case, to ensure that the material is clamped while preventing the crushing thereof, when the stretching rod 29 is in the bottom position, it is preferable to place the distal end 31 thereof so that the distance E1 thereof from the side wall 25 of the well 24 corresponds to the thickness of the material, i.e.:

$$E1 \approx 2.5 \text{ mm}$$

Conversely, the distance E2 of the distal end 31 of the rod 29 from the bottom 27 of the well 24 is advantageously greater than or equal to 3 mm:

$$E2 \geq 3 \text{ mm}$$

With even, preferably:

$$E2 \approx 4 \text{ mm}$$

These adjustments can be made by the judicious selection, set out above, of the parameters A, D1, D2, R (or D3 respectively) and H2.

It can be seen in FIG. 6A and FIG. 6B that the material does not in practice reach the bottom 27 of the well 24 (depending on its thickness, the sprue 14 can however be partially accommodated in the hole 28).

It will be noted that the geometry of the dome 23 can also help to clamp the material. More specifically, according to an embodiment illustrated in FIG. 6A and FIG. 6B, the top edge 26 is rounded in the form of a fillet between the side wall 26 and the outer part of the dome 23. The radius of this fillet is quite small (particularly of the order of 1 mm to 2 mm), and the gradient of the outer part of the dome is quite marked.

As a result, the material that is wrapped closely over the top edge 26 under the high pressure prevailing in the container 1 during blowing locally has a fairly small radius of curvature (and therefore a marked camber), which helps to radially immobilize the slug 9 subjected to the asymmetrical stresses that are exerted in the material.

The invention claimed is:

1. A mold (10) for the forming by stretch blow-molding of a container (1) from a plastic blank (11), this container (1) comprising a body (2), which extends along a main axis (X) and is closed by a bottom (4) defining an annular base (5) that extends in a resting plane (P) substantially perpendicular to the main axis (X), the bottom (4) having, starting from the base (5) and in the direction of the main axis (X), a concave arch (7) pointing towards the inside of the container (1), a central bulb (8) that protrudes from the arch (7) towards the inside of the container (1), and a slug (9) that protrudes at the vertex of the bulb (8) towards the outside of the container (1), this mold (10) comprising:
   - a mold block (15), an inner wall (16) of which defines an at least partial shape of the body (2) of the container (1), the inner wall (16) extending along a main axis (X) corresponding to the main axis (X) of the container (1);
   - a mold base (19) having an upper molding face (20) that defines an at least partial shape of the bottom (4) of the container (1), the mold base (19) having:
     - a peripheral face (21) that complements the arch (7) and extends sloping from near the main axis (X) to an annular groove (22) that complements the base (5),
     - a central dome (23) that complements the bulb (8) and protrudes from the peripheral face (21) towards the inside of the mold (10), and
     - a central well (24) that complements the slug (9), formed in the dome (23) and extending along a truncated conical side wall (25) from a top edge (26) of the dome (23) having a top diameter (D2), i.e. a top radius with a value D2/2, to a bottom (27) having a bottom diameter (D1), i.e. a bottom radius with a value D1/2, and the value of the bottom diameter (D1) being smaller than the value of the top diameter (D2);
   - a stretching rod (29) that ends in a distal end (31) and is mounted sliding relative to the mold block (15) between a top position in which the distal end (31) is separated from the mold base (19), and a bottom position in which the distal end (31) is near the mold base (19);
   wherein the mold, in the bottom position of the rod (29), at it's distal end (31) is separated from the side wall (25) of the central well (24) by a distance (E1) smaller than a distance (E2) that separates it from the bottom (27) of the well.

2. The mold (10) as claimed in claim 1, wherein the side wall (25) has an angular aperture (A), relative to the main axis (X), of between 10° and 30°.

3. The mold (10) as claimed in claim 2, wherein the angular aperture of the side wall (25) is approximately 20°.

4. The mold (10) as claimed in claim 1, wherein the value of the ratio D1:D2 between the bottom diameter (D1) of the bottom (27) of the well and the top diameter (D2) of the top edge (26) of the well (24) is between 65% and 85%.

5. The mold (10) as claimed in claim 1, wherein, in the bottom position of the stretching rod (29), the distal end (31) thereof is at a distance (E1) from the side wall (25) of the central well (24) of approximately 2.5 mm.

6. The mold (10) as claimed in claim 1, wherein the wall (16) of the mold block (15) is rotationally asymmetrical about the main axis (X).

7. The mold (10) as claimed in claim 1, wherein the mold comprises at least one insert (17) that can move transversely relative to the mold block (15), between a retracted position in which the insert (17) is set back from the wall (16), and an extended position in which the insert (17) protrudes from the wall (16) to form a concave recess (6) in the body (2) of the container (1).

8. The mold (10) as claimed in claim 1, wherein the distal end (31) of the stretching rod (29) is hemispherical and has a radius (R) the value of which is smaller than the value (D2/2) of the top radius of the central well (24).

9. The mold (10) as claimed in claim 1, wherein the distal end (31) of the stretching rod (29) is flat and has a diameter (D3) the value of which is smaller than the value of the bottom radius (D1).

10. The mold (10) as claimed in claim 9, wherein the rod (29) has, near its end (31), a taper (B).

11. The mold as claimed in claim 10, wherein:
the side wall (25) has an angular aperture (A), relative to the main axis (X), of between 10° and 30°; and
the taper (B) of the rod (29) is less than the angular aperture (A) of the side wall (25).

12. A method for manufacturing a container (1) in a mold (10) as claimed in claim 1, from a plastic blank (11), the method comprising:
inserting into the mold (10) the blank (11), previously heated to a temperature greater than the glass transition temperature of its constituent material;
injecting a pressurized fluid into the blank (11);
moving the stretching rod (29) from its top position to its bottom position in order to ensure the shear clamping of the material between the distal end (31) of the rod (29) and the truncated conical side wall (24).

13. The mold (10) as claimed in claim 2, wherein the value of the ratio D1:D2 between the bottom diameter (D1) of the bottom (27) of the well and the top diameter (D2) of the top edge (26) of the well (24) is between 65% and 85%.

14. The mold (10) as claimed in claim 2, wherein, in the bottom position of the stretching rod (29), the distal end (31) thereof is at a distance (E1) from the side wall (25) of the central well (24) of approximately 2.5 mm.

15. The mold (10) as claimed in claim 2, wherein the wall (16) of the mold block (15) is rotationally asymmetrical about the main axis (X).

16. The mold (10) as claimed in claim 2, wherein the mold comprises at least one insert (17) that can move transversely relative to the mold block (15), between a retracted position in which the insert (17) is set back from the wall (16), and an extended position in which the insert (17) protrudes from the wall (16) to form a concave recess (6) in the body (2) of the container (1).

17. The mold (10) as claimed in claim 1, wherein the distal end (31) of the stretching rod (29) is hemispherical and has a radius (R) the value of which is smaller than the value (D2/2) of the top radius of the central well (24).

18. The mold (10) as claimed in claim 1, wherein the distal end (31) of the stretching rod (29) is flat and has a diameter (D3) the value of which is smaller than the value of the bottom radius (D1).

* * * * *